United States Patent [19]

Duvent

[11] Patent Number: 4,701,782

[45] Date of Patent: Oct. 20, 1987

[54] METHOD OF AUTOMATIC FOCUSSING BY DIGITAL ANALYSIS OF THE CONTOURS OF AN IMAGE

[75] Inventor: Jean-Louis Duvent, Les Ulis, France

[73] Assignee: U.S. Philips Corporation, New York, N.Y.

[21] Appl. No.: 846,649

[22] Filed: Mar. 31, 1986

[30] Foreign Application Priority Data

Apr. 5, 1985 [FR] France ................. 85 05264

[51] Int. Cl.$^4$ .................................... H04N 5/232
[52] U.S. Cl. .................................... 358/227
[58] Field of Search .................. 358/227; 354/402

[56] References Cited

U.S. PATENT DOCUMENTS

| 3,538,334 | 11/1970 | Shaffer, Jr. | 358/227 |
| 3,621,136 | 11/1971 | Stanwood | 358/227 |
| 4,354,204 | 10/1982 | Kimura | 358/227 |
| 4,392,726 | 7/1983 | Kimura | 354/25 |
| 4,616,264 | 10/1986 | Pshtissky | 358/227 |

FOREIGN PATENT DOCUMENTS 0003331 1/1977 Japan ...................... 358/227

Primary Examiner—Gene Z. Rubinson
Assistant Examiner—Stephen Brinich
Attorney, Agent, or Firm—Marc D. Schechter

[57] ABSTRACT

Method of automatic focussing of a video pickup device having an objective and producing a digital image. According to the invention, this method comprises analyzing the image, within a window, with the aid of at least one digital operator. The digital operator takes the derivatives, in a given direction, of the contours of the image. Thereafter, the absolute values of these derivatives are computed. Finally, a quality parameter defined by the sum, in the window, of the absolute values of the derivatives is calculated. The position of the objective of the pickup device is controlled so as to maximize the value of the quality parameter.

22 Claims, 12 Drawing Figures

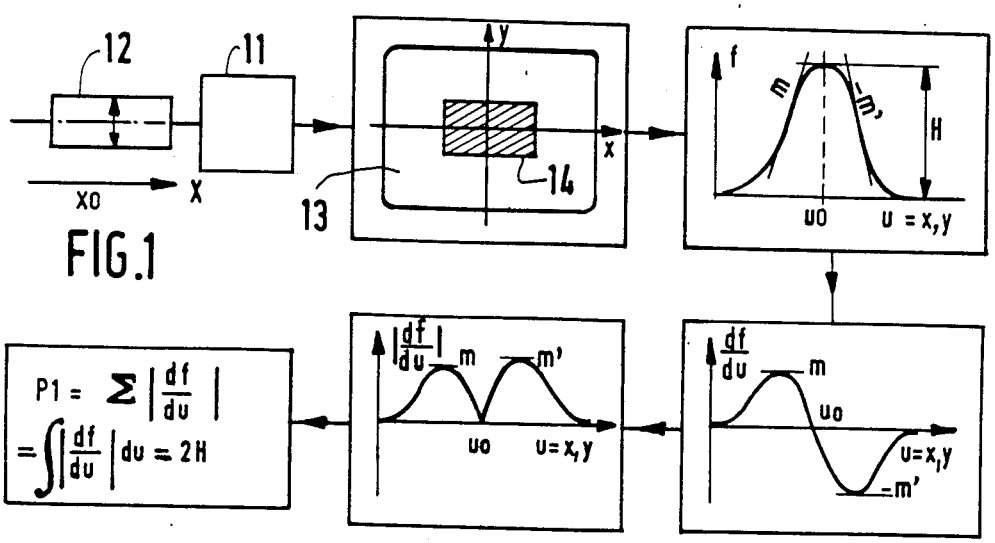
FIG.1
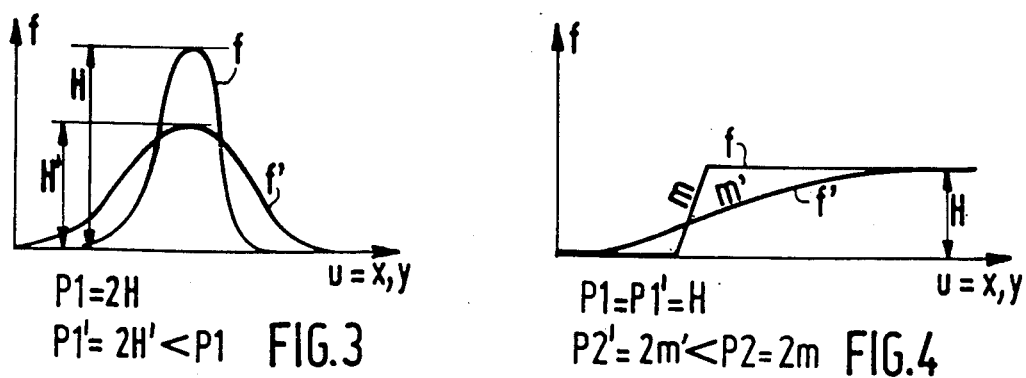
P1=2H
P1'=2H'<P1  FIG.3
P1=P1'=H
P2'=2m'<P2=2m  FIG.4

METHOD OF AUTOMATIC FOCUSSING BY DIGITAL ANALYSIS OF THE CONTOURS OF AN IMAGE

BACKGROUND OF THE INVENTION

The present invention relates to a method of automatically focussing a video pickup device. The pickup device has an objective and produces a digital image. The invention also relates to a video camera in which this method can be used.

The invention is particularly advantageous for use in any video camera in which the operating conditions necessitate frequent focussing corrections, and more specifically for infrared cameras whose germanium optical system has a refractive index, and consequently a focal length which varies with temperature.

An automatic focussing device for video cameras is disclosed in U.S. Pat. No. 4,392,726. In this prior art device, the photo-detecting surface of the camera is positioned such that a d.c. detection signal, integrating the high-frequency components of the image, is maintained at a maximum value. After sampling, the detection signal is differentiated in an analog manner. Thereafter the resultant differential signal is compared with a threshold.

This operation attempts to define a point near the maximum of the detection signal by the point at which the sampled difference signal starts to exceed the threshold. However, taken the sampling operation and the comparison at the threshold into account, this point thus determined does not accurately coincide with the zero point of the difference signal and is consequently not representative of the maximum of the detection signal.

The prior art device further includes means which move the photosensitive surface of the camera from the previously determined position to the position giving the maximum value of the detection signal.

The device of U.S. Pat. No. 4,392,726 has a certain number of disadvantages. It requires a comparatively complex, essentially analog processing chain for the incoming video signal, comprising filtering, integration, sampling, differentiation, comparison, etc. All of these operations, however, are not adequate to produce perfectly satisfactory automatic focussing control, since an operation for correcting the systematic error produced by the device itself has to be added to the above operations. Further, this prior art device is not effective unless the image contains sufficient high-frequency components, which is not the case then the filmed scene has only few details.

SUMMARY OF THE INVENTION

It is an object of the present invention to obviate these disadvantages by providing an automatic focussing method which is much simpler and does not need a correction, based on a purely digital analysis of the contours of the image. In a first embodiment, the invention produces good results for images having a great deal of high frequencies. In a second embodiment, the invention produces good results for images which may have fewer details.

Actually, according to a first embodiment of the invention, the automatic focussing method consists of analyzing the image within a window. The image is analyzed with the aid of at least one digital operator producing, for a field, the so-called first derivatives, in a given direction, of the contours of the image. Thereafter, the absolute values of these first derivatives are taken. Finally, a quality parameter is calculated. The quality parameter is defined by the sum, in the window, of the absolute values of the first derivatives. The position of the objective lens of the pickup device is then controlled so as to obtain the maximum value of the quality parameter.

As will be described below, this quality parameter corresponds to the sum, in the window, of the peak-to-peak values of the fluctuations of the video signal. This type of parameter is consequently very suitable for the case in which the images have sufficient high frequencies. In contrast therewith, it is less effective when the objects of the scene have few fluctuations.

In a second embodiment of the invention, a method of automatic focussing consists of analyzing the image within a window. The image is analyzed with the aid of at least one digital operator producing, for a field, the so-called first derivatives, in a given direction, of the contours of the image. Thereafter, the absolute values of these first derivatives are taken. Next, inside the same window and by means of the same digital operator, the so-called second derivatives of the absolute values of the first derivatives are calculated and the absolute values of the second derivatives are taken. Finally, a quality parameter is calculated. The quality parmeter is defined by the sum, in the window, of the absolute values of the second derviatives. The position of the objective lens of the pickup device is then controlled so as to obtain the maximum value of this second quality parameter.

Consequently, this second embodiment of the invention repeats the processing operation described for the first embodiment for a second time. It produces a second quality parameter which is equal to the sum of the peak-to-peak values of the fluctuations of the first derivatives of the video signal. This second quality parameter is representative of the slope of the contours of the image, and is therefore representative of the quality of the focussing.

In a special embodiment of the invention, the digital operator is an operator of the horizontal derivative along a line of the field, giving the derivatives of the contours of the image in the line direction. Similarly, in a further embodiment, the derivatives of the contours in a direction perpendicular to the lines are obtained when the digital operator is a vertical derivative operator applied perpendicular to a lines of the field.

However, a preferred embodiment provides both a horizontal derivative digital operator and a vertical derivative digital operator which simultaneously calculate the derivatives of the image inside the window. Actually, this bidimensional processing operation renders the quality parameter, of whatever value, little sensitive to rolling of the image.

Finally, so as to eliminate a portion of the false alarms connected with the noise affecting the input data, measures can be taken to ensure that the absolute values of the first and secondary derivatives are compared to respective thresholds, while preserving the absolute values of the derivatives when they exceed the thresholds. This arrangement can, in addition, increase the signal-to-noise ratio, which is still further improved by the fact that the method according to the invention takes the sum of the absolute values of the derivatives in the entire measuring window.

BRIEF DESCRIPTION OF THE DRAWING

FIG. 1 is a block circuit diagram of a first embodiment of the automatic focussing method according to the invention.

FIGS. 3 and 4 graphically show examples of how the quality parameters defined according to the invention are applied to specific contours.

DESCRIPTION OF THE PREFERRED EMBODIMENTS

FIG. 1 schematically shows the different stages of an automatic focussing method for a video pickup device 11 having an objective 12 and producing a digital image 13. This method consists of analyzing the image 13 within a window 14 which is, for example, in the center of the image. With the aid of at least one digital operator the derivative df/du, the so-called first derivatives, are calculated in a given direction u (u being equal to x or -y, for example), of contours f of the image 13.

FIG. 1 shows a contour f with a maximum H and two edges whose maximum respective slopes have values m and −m', wherein m'>0. The corresponding curve df/du is an S-shaped curve whose extremes are m and −m'. According to the method shown in FIG. 1, the absolute values |df/du| of these first derivatives are taken, and a quality parameter P1 is calculated defined by the sum, in the window 14, of the absolute values of the first derivatives:

$$P1 = \Sigma \left| \frac{df}{du} \right|$$

This quality parameter P1 is equivalent to the intergral in the window 14 of the function |df/du|:

$$P1 = \int \left| \frac{df}{du} \right| du,$$

which has a value $$\int_0^{uo} \frac{df}{du} du + \int_{uo}^{\infty} -\frac{df}{du} du = [f]_0^{uo} - [f]_{uo}^{\infty} = 2H,$$

$$P1 = 2H$$

The quality parameter P1 is consequently equal, in general, to the sum of the peak-to-peak values of the fluctuations of the video signal. This parameter is appropriately representative of the focussing, as an error in focussing becomes apparent by a decrease in the peak-to-peak values of the fluctuations of the signal, that is to say when the images contain many high frequencies.

FIG. 3 shows an example of such a situation: the curve f is the curve of a well-foccused contour. The corresponding parameter P1 is P1=2H. The curve f' represents the same contour, but out of focus. The effect of this poor focussing is that the contour is widened and the peak value decreases from H to H'<H. The quality parameter P1' associated with f' is P1'=2H'<P1.

There are however other cases in which the parameter P1 cannot be utilized as it is insensitive to defocussing, as shown in FIG. 4. FIG. 4 shows a correctly focussed contour f, of the type having an ascending edge of height H. The curve f' is the result of a focussing error on the curve f. The slope of the ascending edge is less steep, but if defocussing is not too significant, the maximum of the curve f' has also a value H. The two quality parameters P1 and P1' associated with f and f', respectively, are equal to H. The parameter P1 as defined in the foregoing is therefore no longer suitable for determining focussing. It is therefore preferred to resort to the second embodiment of the invention, resulting in the definition of another quality parameter which is better suited to images containing few high frequencies.

Figure 2:
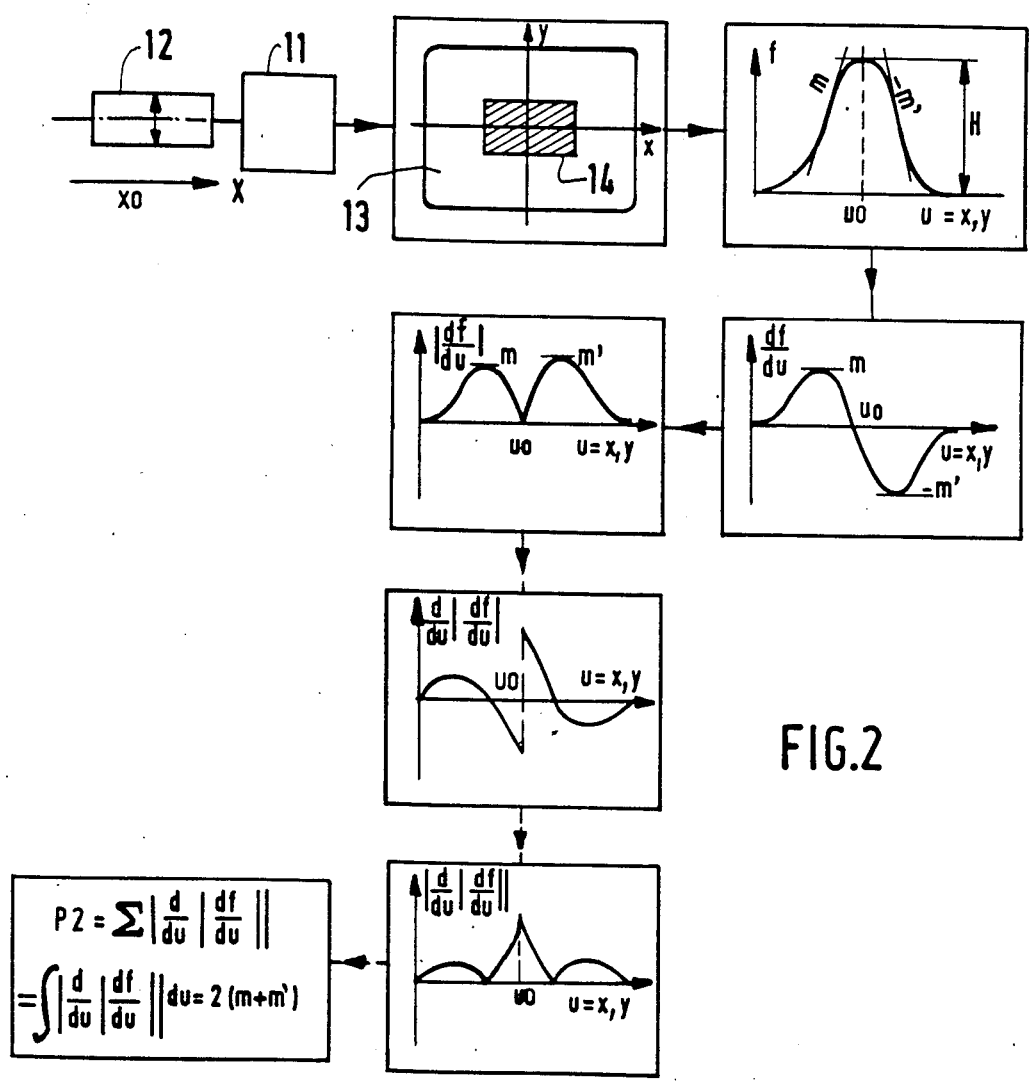
FIG. 2 is a block circuit diagram of a second embodiment of the method according to the invention.

This second embodiment of the invention is schematically shown in FIG. 2. The second embodiment repeats the previously described processing operation. From the absolute values |df/du| of the first derivatives, there are calculated, within the same window 14 and by the same digital operator used to calculate the first derivatives, the derivatives d/du |df/du|, the so-called second derivatives of the absolute values of the first derivatives. The absolute values of the second derivatives. Thereafter a quality parameter P2 is defined by the sum, in the window, of the absolute values of the second derivatives:

$$P2 = \Sigma \left| \frac{d}{du} \left| \frac{df}{du} \right| \right|$$

This quality parameter P2 is equivalent to the integral in the window 14 of the function $$\Sigma \left| \frac{d}{du} \left| \frac{df}{du} \right| \right| = P2 = \int \left| \frac{d}{du} \left| \frac{df}{du} \right| \right| du$$

In the example of FIG. 2, $$P2 = 2(m+m')$$

The quality parameter P2 is equal to the sum of the peak values of the fluctuations of the first derivatives of the video signal.

Returning to the case illustrated in FIG. 4, it is found that the quality parameters P2 and P2', corresponding to the respective curves f and f', have values 2m and 2m'. Consequently P2>P2', which shows that the second quality parameter P2 is very representative of the focussing quality.

Figure 5:
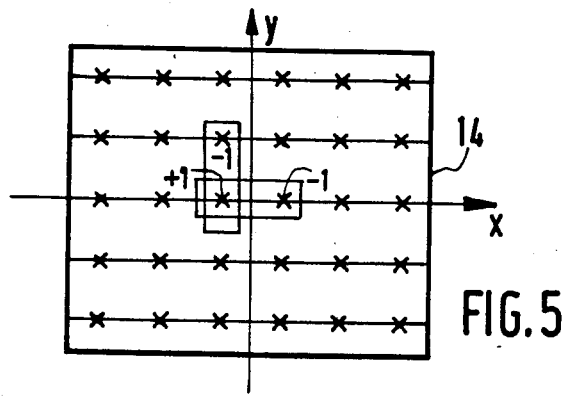
FIGS. 5 and 6 schematically show examples of digital operators for calculating the first and second derivatives of the contours of the image produced by the pickup device.

As shown in FIG. 5, the digital operator may be a horizontal derivative operator [+1,−1] applied along a line x of the field, or a vertical derivative operator $$\begin{bmatrix} -1 \\ +1 \end{bmatrix}$$

applied perpendicularly to a line of the field, in a y-direction.

Figure 6:
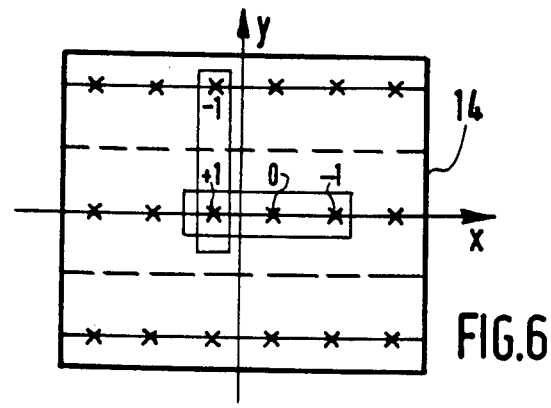

For the case in which the lines are interlaced and in which only one of two lines is available, as shown in FIG. 6, the digital operator is a horizontal derivative operator [+1,0,−1] applied along a line x of the field, so as to establish a symmetry in the action of the vertical and horizontal derivative operators when they are applied simultaneously to the image within the window 14. This embodiment must be preferred to the embodiment which only uses one unidimensional derivative operator for it ensures a certain invariance of the quality parameters relative to the rotations of the image.

Figure 7:
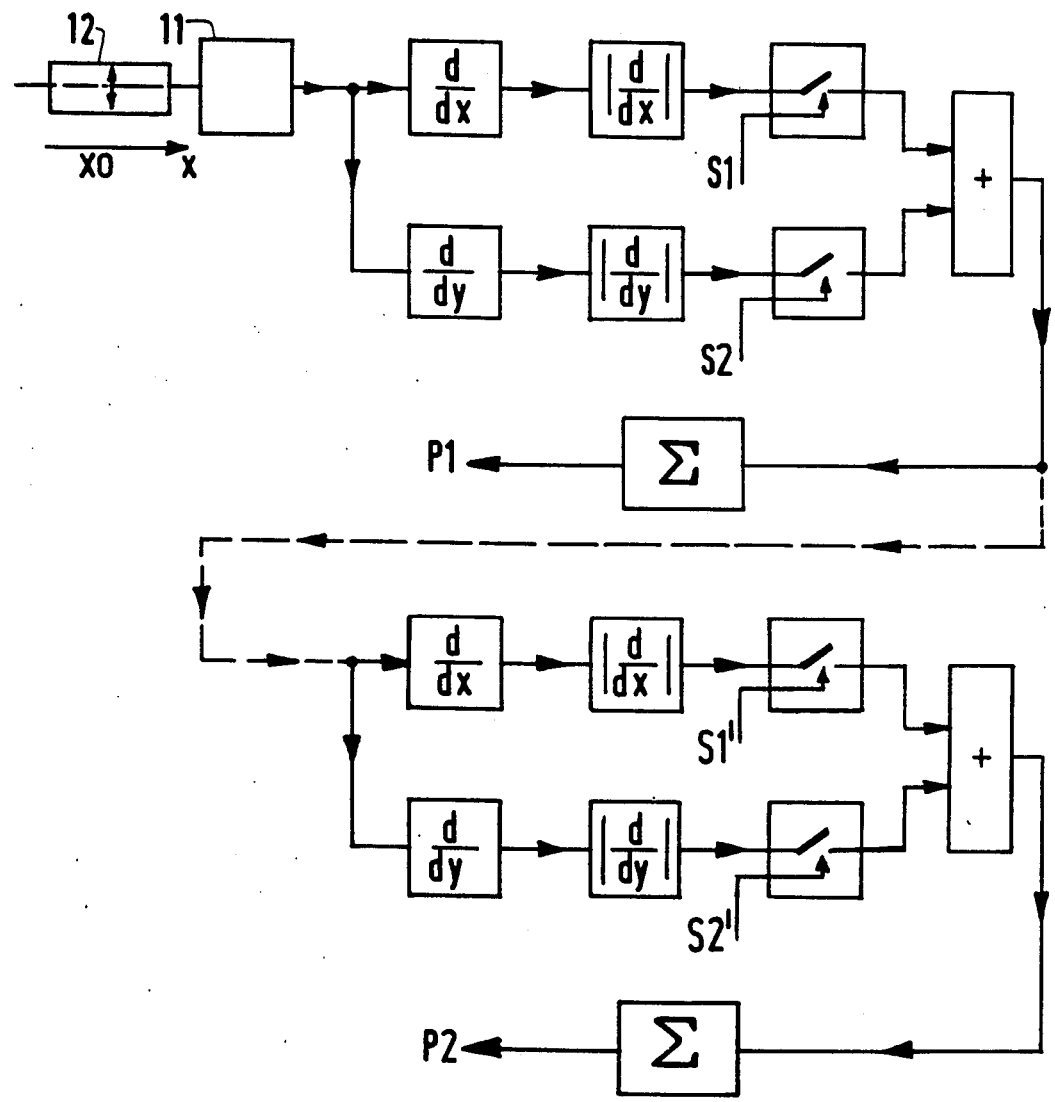
FIG. 7 is a block circuit diagram of the different operations resulting in the determination of the quality parameters.

FIG. 7 shows, in the form of a block diagram all of the operations resulting in the determination of the two quality parameters P1 and P2. As can be seen in FIG. 7, measures have been taken to provide that the absolute values $$\left| \frac{df}{du} \right| \text{ and } \left| \frac{d}{du} \left| \frac{df}{du} \right| \right|$$

of the first and secondary derivatives are compared with the respective thresholds S1, S2, S1′, S2′, while preserving the absolute values of the derivatives when they exceed the thresholds. The values of the thresholds S1, S2, S1′, S2′ can be adjusted such that they do not permit passage of the absolute values of derivatives caused by a signal having a false alarm ratio connected to the statistic of the noise and to the method of recovering the derivatives. For example, assuming that the noise is gaussian noise and white, and by applying as horizontal derivative the operator [+1, 0, −1] and as the vertical derivative the operator $$\begin{bmatrix} -1 \\ +1 \end{bmatrix}$$

in the field, which corresponds to $$\begin{bmatrix} -1 \\ 0 \\ +1 \end{bmatrix}$$

in the image, it can ge calculated that the standard deviation of the noise of each derivative is $\sigma\sqrt{2}$, wherein $\sigma$ is equal to the standard deviation of the noise.

Figure 8A:
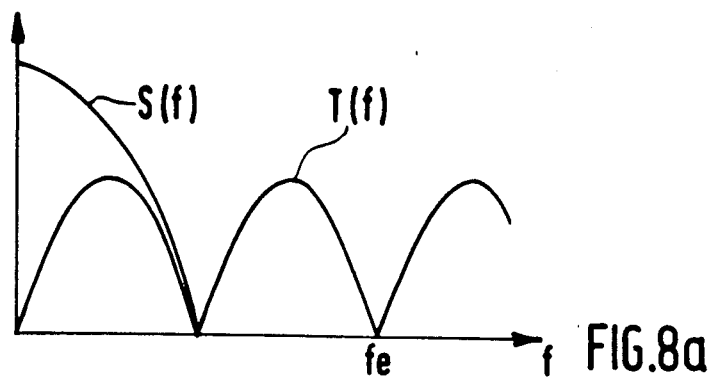
FIGS. 8a and 8b graphically show the transfer functions and the signal spectra, respectively, for the case an ideal focussing (FIG. 8a) and faulty focussing (FIG. 8b).
Figure 8B:
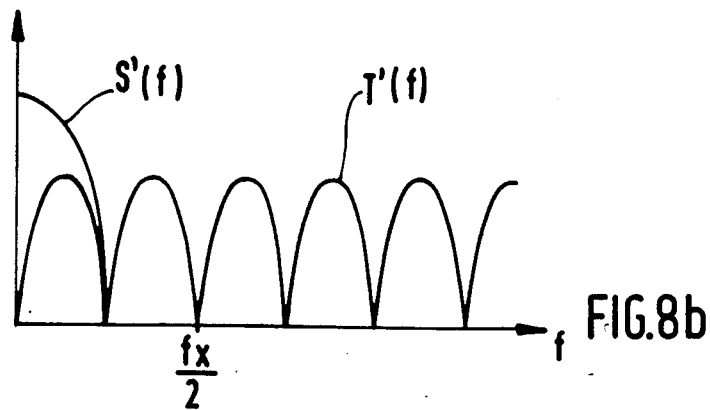

As can be seen from FIGS. 8a and 8b, it is an advantage of the invention that it is possible to adapt the passband of the digital filters constituted by the above derivative operators whose transfer function T(f) is of the type $|\sin 2\pi f/f_e|$ wherein $f_e$ is the sampling frequency, to weak signals. FIG. 8a represents the function of T(f) as well as the spectrum S(f) of a well-focussed image. FIG. 8b shows that it is possible to divide the sampling frequency by, for example, 2 so as to match it to the signal S′(f) which corresponds to a defocussed image.

The invention is not limited to the sole above-defined derivative operators, it can actually utilize other operators of the same type, such as the digital filters known as Sobel filters which take the form of the matrix $$\begin{bmatrix} 1 & 0 & -1 \\ 2 & 0 & -2 \\ 1 & 0 & -1 \end{bmatrix}$$

for calculating the horizontal derivatives and the matrix $$\begin{bmatrix} 1 & 2 & 1 \\ 0 & 0 & 0 \\ -1 & -2 & -1 \end{bmatrix}$$

for calculating the vertical derivatives.

Figure 9A:
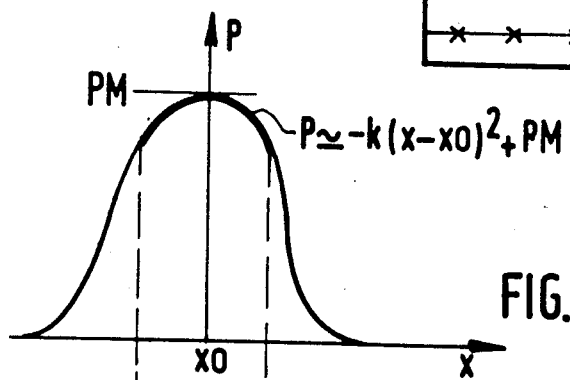
FIGS. 9a and 9b graphically show the variations of the quality parameter (FIG. 9a) and of its derivatives (FIG. 9b) versus the position of the objective of the pickup device.

After having determined the quality parameter P (P having the value P1 or P2), it is utilized to control the position of the objective 12 of the picture pickup device 11 so as to obtain the maximum value of the quality parameter P. In conformity with FIGS. 1 and 7, the variable giving the position of the objective will be called X and the value of this variable corresponding to perfect focussing will be called Xo. As shown in FIG. 9a, the quality parameter P is a function of X crossing through a maximum PM for X=Xo.

One control mode consists, first of all, in sampling the curve of FIG. 9a which represents the variations of the quality parameter P by the position X of the objective of the picture pickup device. This sampling operation renders it possible to determine the coefficient k occurring in the equation in the osculatory parabola $$P = -k(X-Xo)^2 + PM$$

giving the parameter P around xo. The sampling operations, the operations for calculating the best parabola and the operation for determining the coefficient k may be effected by a calculator. It is then possible to maintain the position X of the objective at the position Xo by treating the derivative error dP/dX of the parameter P as a linear function of X:

$$dP/dX = -2k(X-Xo)$$

Figure 9B:
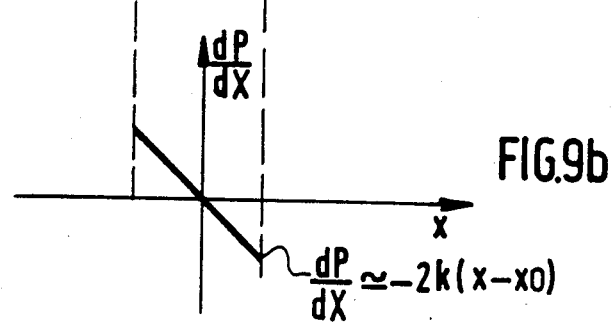

This straight line is shown in FIG. 9b.

Figure 10:
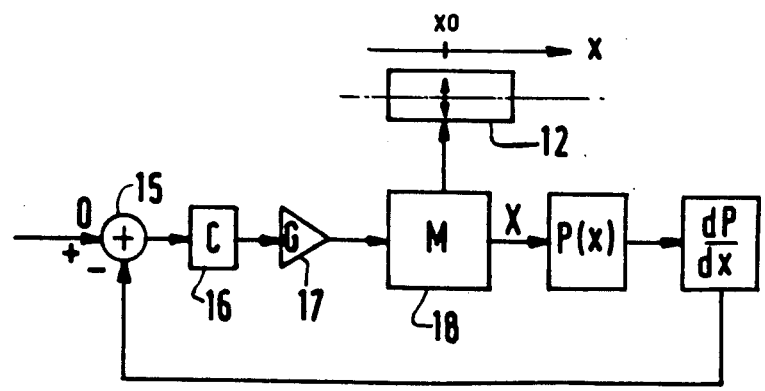
FIG. 10 is a block circuit diagram of a linear control circuit in which the automatic focussing method according to the invention is used.

A circuit diagram of the linear control using the method according to the invention is shown in FIG. 10. The derivative dP/dX is compared with the target value 0 by a comparator 15 which produces an error voltage. The comparator 15 is followed by a corrector 16 (C), and an amplifier 17 having a gain G which controls a focussing motor 18 (M). For each position of X of the objective 12 the circuit shown in FIG. 10 calculates P and its derivative relative to X.

The invention is not limited to the above-described linear control, it will be obvious that it can be employed for any known type of control, even for a nonlinear type of control.

What is claimed is:

1. A method of automatically focusing an image onto a video pickup device, said method comprising the steps of:
    arranging an objective in front of the pickup device to direct radiation onto the pickup device;
    generating a contour signal representing the intensity of the radiation on the pickup device as a function of the position on the pickup device;
    generating a first derivative signal representing the derivative of the contour signal with respect to position along a line on the pickup device;
    generating an absolute value signal representing the absolute value of the first derivative signal;
    generating a quality parameter representing the integral of the absolute value signal with respect to position; and
    controlling the position of the objective so as to maximize the quality parameter.

2. A method as claimed in claim 1, characterized in that all of the signals are digital signals.

3. A method as claimed in claim 2, characterized in that the first derivative signal represents the derivative of the contour signal with respect to position on a plurality of lines in a window on the pickup device.

4. A method as claimed in claim 3, characterized in that the lines are straight.

5. A method as claimed in claim 4, characterized in that the lines are parallel to each other.

6. A method as claimed in claim 5, characterized in that:
    the lines are field lines; and
    the first derivative is generated by a $[+1, -1]$ digital operator.

7. A method as claimed in claim 5, characterized in that:
    the lines are field lines; and
    the first derivative is generated by a $[+1, 0, -1]$ digital operator.

8. A method as claimed in claim 5, characterized in that:
    the lines are perpendicular to field lines; and
    the first derivative is generated by a $$\begin{bmatrix} -1 \\ +1 \end{bmatrix}$$

digital operator.

9. A method as claimed in claim 4, characterized in that the lines comprise both field lines and lines perpendicular to field lines.

10. A method as claimed in claim 4, characterized in that the step of generating the quality parameter further comprises:
    comparing the absolute value signal with a threshold value; and
    reducing to zero any portions of the absolute value signal which do not exceed the threshold.

11. A method as claimed in claim 4, characterized in that the position of the objective is controlled by the steps of:
    generating an error signal equal to the derivative of the quality parameter with respect to the position of the objective; and
    controlling the position of the objective so as to drive the error signal to zero.

12. A method of automatically focusing an image onto a video pickup device, said method comprising the steps of:
    arranging an objective in front of the pickup device to direct radiation onto the pickup device;
    generating a contour signal representing the intensity of the radiation on the pickup device as a functon of the position on the pickup device;
    generating a first derivative signal representing the derivative of the contour signal with respect to position along a line on the pickup device;
    generating a first absolute value signal representing the absolute value of the first derivative signal;
    generating a second derivative signal representing the derivative of the first absolute value signal with respect to position along the line on the pickup device;
    generating a second absolute value signal representing the absolute value of the second derivative signal;
    generating a quality parameter representing the integral of the second absolute value signal with respect to position; and
    controlling the position of the objective so as to maximize the quality parameter.

13. A method as claimed in claim 12, characterized in that all of the signals are digital signals.

14. A method as claimed in claim 13, characterized in that:
    the first derivative signal represents the derivative of the contour signal with respect to position on a plurality of lines in a window on the pickup device; and
    the second derivative signal represents the derivative of the first absolute value signal with respect to position on the same plurality of lines.

15. A method as claimed in claim 14, characterized in that the lines are straight.

16. A method as claimed in claim 15, characterized in that the lines are parallel to each other.

17. A method as claimed in claim 16, characterized in that:
    the lines are field lines; and
    the first derivative is generated by a $[+1, -1]$ digital operator.

18. A method as claimed in claim 16, characterized in that:
    the lines are field lines; and
    the first derivative is generated by a $[+1, 0, -1]$ digital operator.

19. A method as claimed in claim 16, characterized in that:
    the lines are perpendicular to field lines; and
    the first derivative is generated by a $$\begin{bmatrix} -1 \\ +1 \end{bmatrix}$$

digital operator.

20. A method as claimed in claim 15, characterized in that the lines comprise both field lines and lines perpendicular to field lines.

21. A method as claimed in claim 15, characterized in that the step of generating the quality parameter further comprises:

comparing the first absolute value signal with a threshold value; and reducing to zero any portions of the first absolute value signal which do not exceed the threshold.

22. A method as claimed in claim 15, characterized in that the position of the objective is controlled by the steps of:

generating an error signal equal to the derivative of the quality parameter with respect to the position of the objective; and controlling the position of the objective so as to drive the error signal to zero.

* * * * *